UNITED STATES PATENT OFFICE.

KARL ELBEL AND IGNAZ ROSENBERG, OF BIEBRICH, GERMANY, ASSIGNORS TO KALLE & CO., OF SAME PLACE.

PRIMARY DISAZO BLUE-BLACK DYE.

SPECIFICATION forming part of Letters Patent No. 613,638, dated November 1, 1898.

Application filed December 27, 1897. Serial No. 663,471. (Specimens.)

*To all whom it may concern:*

Be it known that we, KARL ELBEL, a subject of the King of Prussia, German Emperor, and IGNAZ ROSENBERG, a subject of the Emperor of Austria-Hungary, doctors of philosophy, residing at Biebrich-on-the-Rhine, Germany, and assignors to KALLE & CO., of same place, have invented certain new and useful Improvements in the Manufacture of a Blue-Black Primary Disazo Coloring-Matter, of which the following is a specification.

This invention relates to a new method of manufacturing primary disazo coloring-matters from the amidonaphtholdisulfo-acid (K)—*i. e.*, acid sodium salt of the 1.8.4.6 amidonaphtholdisulfo-acid. Under "primary disazo coloring-matters" we understand in this case azo coloring-matters formed by the action of two molecules of a diazo body or of one molecule each of two different diazo bodies upon one molecule of the amidonaphtholdisulfo-acid.

While the 1.8.3.6 amidonaphtholdisulfo-acid (H) can be used for the preparation of primary disazo colors only if the first diazo compound is combined with it in weakly-acid combination liquid to a monoazo color, which is then combined with a second molecule of a diazo body in alkaline solution, we have found that the primary disazo coloring-matters from the 1.8.4.6 amidonaphtholdisulfo-acid (K) can be prepared by combining the latter with both diazo molecules in acid solution. This property of the amidonaphtholdisulfo-acid (K) distinguishes it essentially from the other known peri-amidonaphtholdisulfo-acids.

Since there are only a few diazo compounds which can be combined with the amidonaphtholdisulfo-acid (H) in an acid reaction liquid in a practical manner to homogeneous monoazo colors, one is very much restricted in the choice of these diazo compounds and must nearly exclusively resort to the application of nitrodiazo bodies in the first place. When using the amidonaphtholdisulfo-acid, (K,) there is no such restriction, because this acid combines quite smoothly with the diazo compounds of the usually-employed amins and sulfo-acids thereof to monoazo colors even in strongly-acid solution.

In the following we describe the preparation of a new dyestuff according to the method newly discovered by us.

Example: 36.2 kilos neutral sodium salt of amidonaphtholdisulfo-acid (K) dissolved in one thousand liters of water are run under cooling into a strongly-acid alpha-diazonaphthalene solution obtained from 14.3 kilos alpha-naphthylamin, thirty kilos hydrochloric acid, one thousand liters of water, and 6.9 kilos sodium nitrite. The formation of the monoazo color is completed after ten hours' stirring. It is then combined, at a temperature of about 5° centigrade, with the diazo body obtained in the usual manner from 9.3 kilos anilin, two hundred and fifty liters of water, two hundred kilos of ice, twenty-seven kilos hydrochloric acid, and 6.9 kilos sodium nitrite. The second combination commences immediately and can be hastened by addition of sodium acetate in such a manner that it is finished after a few hours. The combination liquid is then heated, and the dyestuff is isolated therefrom by salting out and filtering. It separates out in the form of crystalline leaflets having a bronzy luster, and it dyes wool a blue black.

The dyestuff represents a bronzy powder easily soluble in water, difficultly soluble in alcohol, with a deep violet-blue coloration. In concentrated sulfuric acid the dyestuff is dissolved with a dirty-green coloration, which changes to blue on dilution with much water. From the concentrated aqueous solution the free acid of the coloring-matter is precipitated by addition of concentrated hydrochloric acid. The color dyes wool deep blue-black shades of great fastness from an acid-bath.

What we claim is—

1. As a new method of manufacture the preparation of a primary disazo coloring-matter dyeing wool a blue black from the 1.8.4.6 amidonaphtholdisulfo-acid (K) by combining the said acid first with one molecule of alpha-diazonaphthalene in presence of free mineral acid and then acting upon the so-formed monoazo color with one molecule of diazo-benzene in an acid combination liquid.

2. The new dyestuff hereinbefore described, producible by combining 1.8.2.6 amidonaphtholdisulfo-acid (K) first with one molecule of alpha-diazonaphthalene in the presence of free mineral acid and then acting upon the so-formed monoazo color with one molecule of diazo-benzene in acid combination liquid, and which consists of a bronze-colored powder easily soluble in water difficultly soluble in alcohol with a deep-blue coloration, soluble in concentrated sulfuric acid with a dirty-green color, the aqueous solution of which is precipitated by addition of hydrochloric acid, the sulfuric-acid solution of which turns blue by addition of water, and which dyes wool from an acid-bath deep blue-black shades.

In testimony whereof we have signed our names to this specification in the presence of two subscribing witnesses.

KARL ELBEL.
IGNAZ ROSENBERG.

Witnesses:
C. REINHARD,
JACOB ADRIAN.